(12) United States Patent
Lin et al.

(10) Patent No.: US 6,754,225 B1
(45) Date of Patent: Jun. 22, 2004

(54) OPTIMAL CONTENTION REGION ALLOCATION FOR MEDIUM ACCESS CONTROL IN MULTIPOINT-TO-POINT NETWORKS

(75) Inventors: Ying-Dar Lin, Taipei (TW); Wei Ming Yin, Hsinchu (TW); Yeong-Sung Lin, Hsinchu (TW)

(73) Assignee: National Science Council, Taipei (TW)

( * ) Notice: Subject to any disclaimer, the term of this patent is extended or adjusted under 35 U.S.C. 154(b) by 848 days.

(21) Appl. No.: 09/598,667

(22) Filed: Jun. 20, 2000

(30) Foreign Application Priority Data

Feb. 24, 2000 (TW) .................................. 89103228 A

(51) Int. Cl.[7] .................................................. H04J 3/14
(52) U.S. Cl. ..................... 370/442; 370/461; 370/462
(58) Field of Search .............................. 370/442–445, 370/458–462

(56) References Cited

U.S. PATENT DOCUMENTS

| | | | | |
|---|---|---|---|---|
| 5,953,344 A | * | 9/1999 | Dail et al. ................... | 370/443 |
| 6,529,520 B1 | * | 3/2003 | Lee et al. ................... | 370/442 |

OTHER PUBLICATIONS

Charoenpanitkit, A. et al, "An analysis of a new access control technique for channel request in wireless communications", May 2001, Circuits and Systems, 2001, IEEE, vol. 2, pp. 333–336.*

Daigle, J.N. et al, 'Analysis of Packet Networks Having Contention–Based Reservation With Application to GPRS', IEEE/ACM Transactions on Networking, vol. 2, No. 4, Aug. 2003, pp. 602–615.*

L. Merakos, et al.; Delay Analysis of the n–Ary Stack Random–Access Algorithm; IEEE Transactions on Information Theory, vol. 34, No. 5, Sep. 1988; pp. 931–942.

* cited by examiner

Primary Examiner—Melvin Marcelo
(74) Attorney, Agent, or Firm—Norris McLaughlin & Marcus P.A.

(57) ABSTRACT

A method of optimal contention region allocation for medium access control in multipoint-to-point networks, and in particular a method of obtaining optimal contention region allocation so that to achieve optimal throughput. The method establishes an optimal table so that the object of optimal allocation to reduce collision for medium access in multipoint-to-point networks can be achieved. Based on the aspects of present invention, optimal throughput can be achieved, thus reducing the wastage of bandwidth.

6 Claims, 8 Drawing Sheets

The MRL table with 9 slots

| the number of requests | the number of collided slots | | | | | | | | | |
|---|---|---|---|---|---|---|---|---|---|---|
| | | 0 | 1 | 2 | 3 | 4 | 5 | 6 | 7 | 8 | 9 |
| successful slot | 0 | 0 | 2 | 4 | 6 | 8 | 10 | 12 | 16 | 21 | 23 |
| | 1 | 1 | 3 | 5 | 7 | 9 | 12 | 14 | 17 | 21 | 25 |
| | 2 | 2 | 4 | 6 | 8 | 10 | 13 | 15 | 18 | 21 | 25 |
| | 3 | 3 | 5 | 7 | 9 | 11 | 14 | 16 | 20 | 21 | 25 |
| | 4 | 4 | 6 | 8 | 10 | 12 | 15 | 18 | 20 | 23 | 26 |
| | 5 | 5 | 7 | 9 | 11 | 13 | 16 | 19 | 21 | 25 | 28 |
| | 6 | 6 | 8 | 10 | 12 | 15 | 17 | 20 | 22 | 26 | 30 |
| | 7 | 7 | 9 | 11 | 13 | 16 | 18 | 21 | 24 | 27 | 31 |
| | 8 | 8 | 10 | 12 | 14 | 17 | 19 | 22 | 25 | 29 | 31 |
| | 9 | 9 | 11 | 13 | 15 | 18 | 20 | 23 | 26 | 30 | 32 |

Fig. 2

Part of OPT table number of requests | optimal contention region

| n | d |
|---|---|
| 0,1 | 1 |
| 2 | 2 |
| 3 | 3 |
| 4 | 4 |
| 5 | 6 |
| 6 | 8 |
| 7 | 11 |
| 8 | 12 |
| 9 | 15 |
| 10 | 16 |
| 11 | 19 |
| 12 | 21 |
| 13 | 23 |
| 14 | 25 |
| 15 | 27 |
| 16 | 28 |
| 17 | 31 |
| 18 | 33 |
| 19 | 35 |
| 20 | 36 |

Fig. 3

Number of requests at the beginning of each cycle

OPTIMAL CONTENTION REGION ALLOCATION FOR MEDIUM ACCESS CONTROL IN MULTIPOINT-TO-POINT NETWORKS

BACKGROUND OF THE INVENTION

1. Field of the Invention

The present invention generally relates to an optimal contention region allocation for medium access control. More specifically, the present invention relates to an optimal contention region allocation for medium access control in multipoint-to point networks.

2. Description of the Related Art

Wired broadband networks, such as HFC, and wireless broadband networks, such as MMDS networks, are key access technologies to extend NII to the home due to their large bandwidth and two-way communication capability. In these network structures, the transmission delay between a head-end and each station is too large to be neglected. Therefore, the head-end and each station must be synchronized. Synchronization is performed by sending the stations' requests for ranging in order to execute a ranging in synchronization. At the same time, in order to effectively utilize the bandwidth, such networks utilize a reservation and a fixed bandwidth access mode. For the bandwidth access, the stations must send a request to the head-end because the bandwidth is allocated by the head-end. Thus, allocating bandwidth is achieved by utilizing the ranging in synchronization or bandwidth reservation.

For the ranging in synchronization, the stations' requests for the range are sent within a range assigned by the head-end. Similarly, the stations' requests for the bandwidth are sent within the range assigned by the head-end. The regions assigned by the head-end are referred to as "contention regions". Since the upstream channel within the contention region is shared by multipoint-to-point, the stations' requests may collide within the contention region and thus lead to the wastage of bandwidth and a larger request access delay. That is, even though the possibility of collision will be reduced within a bigger contention region, it will lead to the wastage of bandwidth and increase the access delay if the contention region is too big. On the other hand, the possibility of collision will greatly increase if the contention region is too small. To resolve the collision problem is to assign the contention region repeatedly for collision groups until no collision group. This also wastes the bandwidth. Therefore, the allocation of contention region is essential for efficiency of bandwidth usage.

A traditional method for allocating contention regions is disclosed in Lazaros Merakos and Chatschik Bisdikian, "Delay analysis of the n-ary stack random-access algorithm", IEEE Trans. On Information Theory, vol. 34, no. 5, pp. 931–942, September 1988.

The n-ary method applies statistics to find the possibility of collision within a synchronized random access system. Applying this method to a slot-typed contention with under 100 slots (within a given contention region) and 100 requests participating contention, the possibility of collision is 2.2 to 2.3 requests on average in a slot. Therefore, the throughput is optimal as n=3. That is, the collision problem can be solved by allocating 3 slots to the collided clusters. However, such a fixed contention region method cannot be applied to a practical dynamic contention environment.

SUMMARY OF THE INVENTION

Therefore, an object of the present invention is to provide a method of determining an optimal contention region to achieve efficient contention region usage.

Another object of the present invention is to provide a method of determining a contention region allocation to achieve the maximum throughput of the contention region.

Another object of the present invention is to provide a method of determining a contention region allocation for medium access control in multipoint-to-point networks. The method is applied to obtain maximum throughput either in synchronized or in asynchronized collision resolutions.

The objects of present invention are achieved by providing an optimal ranging method for medium access control in multipoint-to-point networks. The method applies the possibility of collision to establish an optimal table so that the optimal efficiency of usage for medium access in multipoint-to-point networks can be achieved. A contention cycle of the present invention consists of an initial contention and collision resolution phase. A station failing to send its request in the initial contention will exercise the collision resolution process until the request is sent successfully, wherein the access channel of request is of blocking mode.

The method of the present invention comprises the steps as follow. First, a Most Likely Request Table MLR (d,s,c) and an Optimal Table OPT (n,d) are found by simulating the practical contention situation with a computer. Second, for the initial contention of a new contention cycle, the head-end utilizes the proportional scheme to estimate the number of requests participating the contention in the new contention cycle. Thus, the optimal contention region is obtained, based on that number, by looking up Table OPT(n,d), where n is the requests and d is n's corresponding optimal contention region. Third, in the collision resolution phase, for each contention round, the number of collided requests is estimated, based on the contention result, through the Table MLR(d,s,c), where d is the allocated contention region, s is the number of successful requests, and c is the number of collided clusters. Finally, looking up the Table OPT (n,d) based on the estimated number of collided clusters, the optimal value d of each contention region can be determined and the throughput of requests is maximized. Therefore, optimal throughput can be achieved and the wastage of bandwidth reduced (see FIGS. 6, 7, and 8).

These and further features, aspects and advantages of the present invention, as well as the structure and operation of the embodiment thereof, will become readily apparent with reference to the following detailed description of a presently preferred but nonetheless illustrative embodiment, when read in conjunction with the accompanying drawings. In the drawings, like reference numbers indicate identical or functionally similar elements.

BRIEF DESCRIPTION OF THE DRAWINGS

The drawings referred to herein will be understood as not being drawn to scale except if specially noted, the emphasis instead being placed upon illustrating the principles of the present invention. In the accompanying drawings:

FIG. 2 is part of the Most Likely Request Table MLR established by simulating the practical contention condition with a computer.

FIG. 3 is part of the Optimal Table OPT established at asynchronic period by simulating the practical contention condition with a computer.

DETAILED DESCRIPTION OF THE PREFERRED EMBODIMENTS

Figure 1:
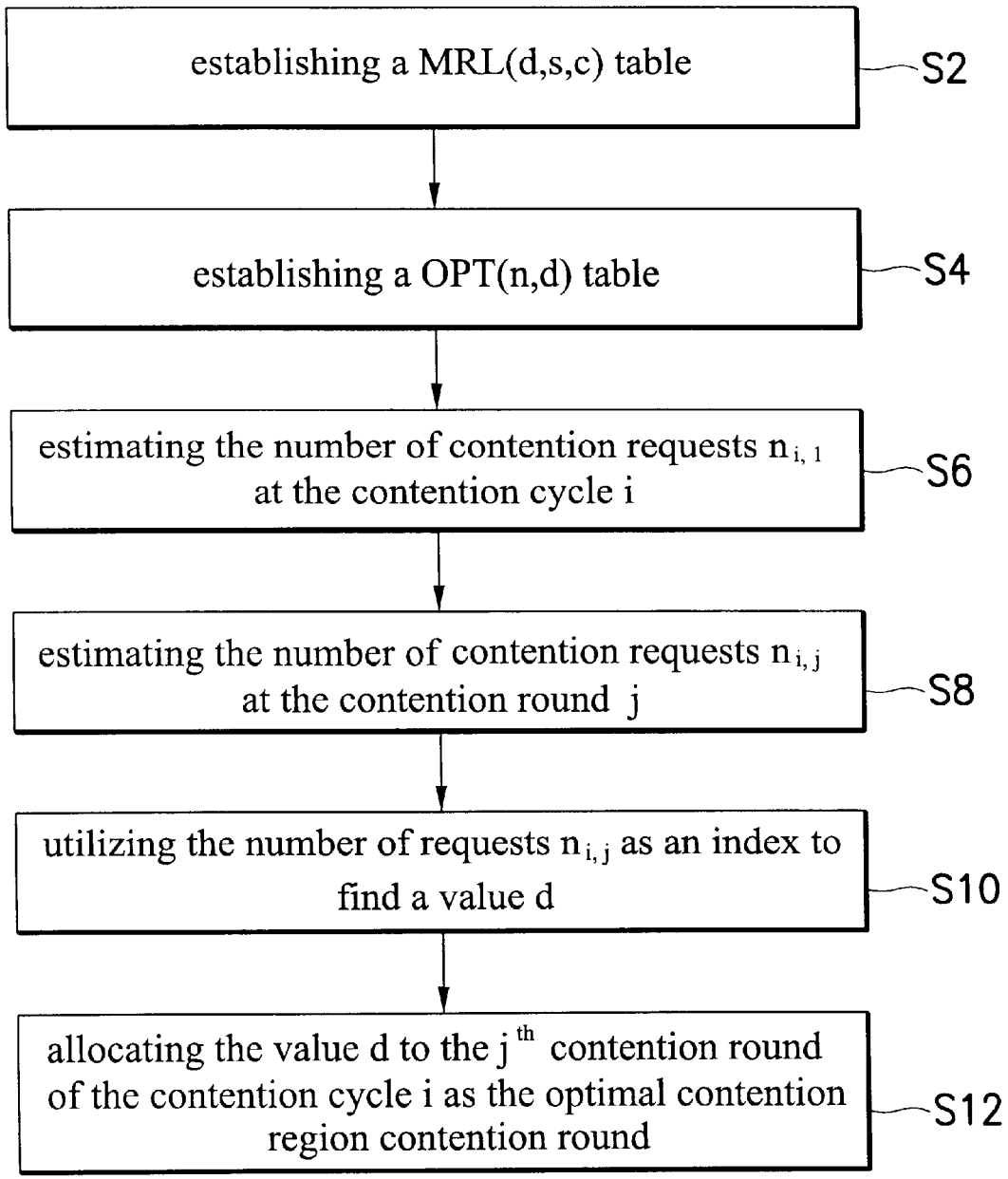
FIG. 1 is the flow chart illustrating the method of determining the optimal contention region allocation according to the present invention.

Referring to FIG. 1, a method of determining an optimal contention region allocation for medium access control in multipoint-to-point networks comprises the steps: establishing a Most Likely Request Table MLR(d,s,c), where d is the contention region, s is the number of successful requests, and c is the number of collided clusters (S2); establishing a Optimal Table OPT(n,d), where n is the number of estimated succeeding contention requests and d is the corresponding optimal contention region (S4); estimating the number of contention requests $n_{i,1}$ at the contention cycle i, where i is the next contention cycle and $n_{i,1}$ is the number of initial requests at the start of the contention cycle i (S6); estimating the number of contention requests $n_{i,j}$ at the contention round j, where j>1, and $n_{i,j}$ is the number of requests in the $j^{th}$ contention round of the contention cycle i. According to the contention result of previous contention round, the estimating method is to look up the Table MLR(d,s,c) according to the estimated number of requests $n_{i,j}$ (S8); utilizing the number of requests $n_{i,j}$ as an index to find a value d corresponding to the number of requests $n_{i,j}$ in the Table OPT(n,d), where the value d is the optimal contention region in the $j^{th}$ contention round of the contention cycle I (S10); allocating the value d to the $j^{th}$ contention round of the contention cycle i as the optimal contention region (S12).

Referring to FIG. 2, the table is a part of the Most Likely Request Table MLR established by simulating the practical contention region with a computer. Establishing a complete MLR table comprises the steps as follows: First, in a given contention region d (i.e. d slots), the number of request participating in the contention is ranged from 1 to an integer having statistical meaning (such as 500). Each request is sent by a slot selected from the given d slots dynamically. Simulate each of the number of requests (i.e., 1,2,3, ... 500 requests) $10^5$ times to obtain a pair (s,c) respectively representing the number of successful requests and collided clusters, wherein (s,d) denotes the number of successful requests during simulation with the given slots to be the values of MLR(d,s,c). An example with 9 slots in FIG. 2 is shown. In the example, if an observation during simulation found 4 successful requests and 4 collided requests, the largest possibility for the number of requests should be 12.

Establishing an optimal table OPT(n,d) comprises the steps as follows:

1. If the system is synchronized as an allocating contention region (e.g., at bandwidth reservation process), $d_{ij}=n_{ij}$. The proof is as follows:

The station and head-end are synchronized, i.e., the station's timing is synchronized to the slot from the head-end.

With d slots (contention regions), the possibility of each slot being selected is 1/d according to the probability concept while the possibility of slot being unselected is (1−(1/d)). If n (n>1) requests contend d slots, the probability of a slot being successfully contended (i.e., the condition of one request to one slot) is:

$$f_n(d) = n \cdot \left(\frac{1}{d}\right) \cdot \left(1 - \frac{1}{d}\right)^{n-1}$$

Differentiate the equation by d:

$$f'_n(d) = n \cdot \left[\frac{1}{d^3} \cdot \left(1 - \frac{1}{d}\right)^{n-2} \cdot (n-d)\right]$$

When the differential equation above is equal to 0, n is equal to d. That is, the probability of the slot having the optimal contention regions will be the greatest when the number of slots is equal to the number of requests.

Figure 4A:
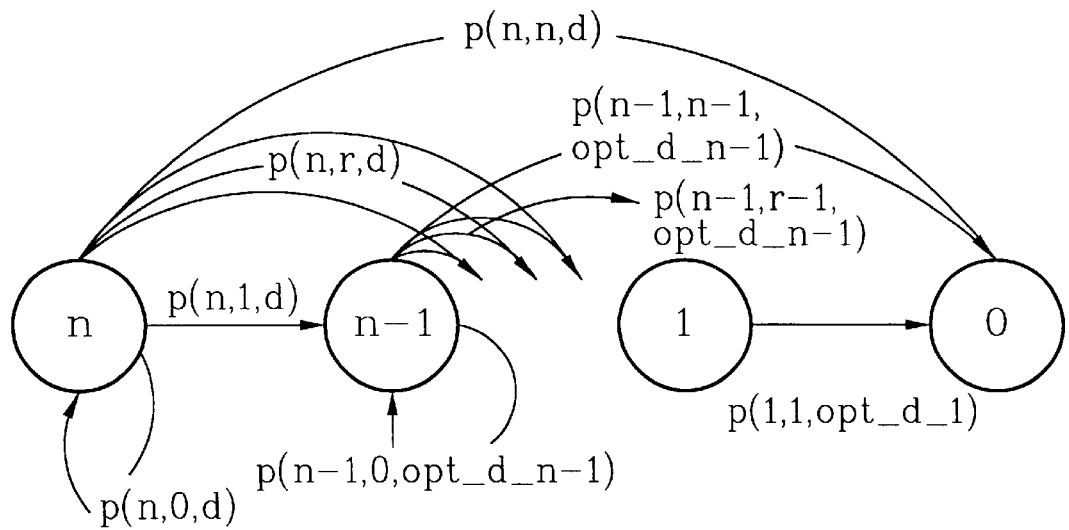
FIG. 4A is the state transition diagram of contention in which the number of requests is greater than 1.
Figure 4B:
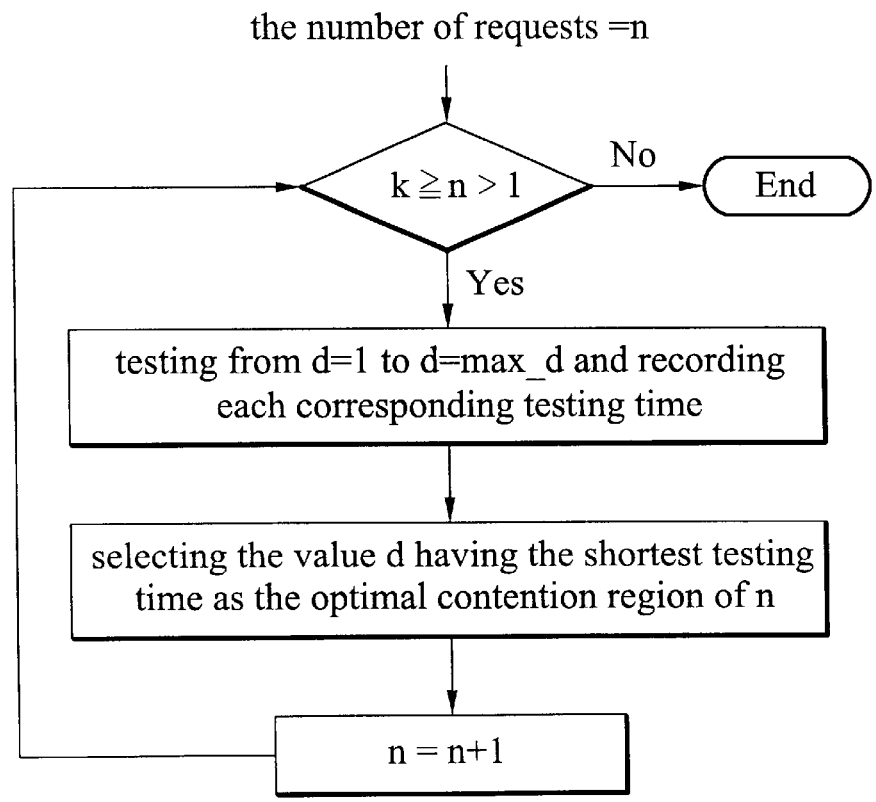
FIG. 4B is the flow chart illustrating the method of establishing the OPT table with the number of requests is greater than 1.

2. If the system is not yet synchronized while allocating contention regions (i.e., not performing the ranging in synchronization), the Optimal Table OPT(n,d) can be derived from p(n,m,d), wherein p(n,m,d) is the probability of m successful requests when n requests (n>1) contend d slots. FIG. 3 is a part of optimal table OPT established under the asynchronized condition of the present invention. Referring to FIG. 4a, a contention state transition diagram establishing the asynchronized Optimal Table is shown. Referring to FIG. 4b, a flow chart of utilizing the transition diagram to establish the asynchronized Optimal Table p(n,m,d) is shown. In FIG. 4a, opt_d_n is defined as an optimal contention region corresponding to n requests, wherein n>1. If n=0 or n=1, opt_d_0=opt_d_1=0. Under this condition, it is not necessary to determine the optimal contention region. If n>1, each request (such as n=2 to 20 in FIG. 3) utilizes the probability model established by the computer to calculate contention regions (slots) from d=1 to d=max_d. Select the value d, which spends the minimum time from state=n to state=0 (n=0) in the computer, to be the optimal contention region corresponding to the request number n. In other words, the corresponding optimal contention region of the request n is the minimum time spent while running in FIG. 4a. That is, value d is the optimal number of slots needed for the successful requests of the n stations (state=n) sent to the head-end (state=0). Referring to FIG. 3, for example, when the number of slots is the same as that of requests, the optimal contention region can be obtained when n=0 to n=4, thus obtaining the optimal request throughput such that the time for successful requests is minimum. The number of slots needed is more than the number of requests because the increasing number of requests causes the possibility of collision to increase when n=4 to n=20. Referring to FIG. 4B, establishing the asynchronized Optimal Table OPT (n,d) comprises the steps of:

1. determining whether or not the number of request n is ranged between value 1 and the maximum value k;
2. testing the contention region opt_d_n for each request number n (from 1 to a given maximum number max_d); and
3. selecting one contention region opt_d_n from 1 to the number not_d based on which has the shortest testing time, to be the d value of the currently testing request number n.

Figure 5:
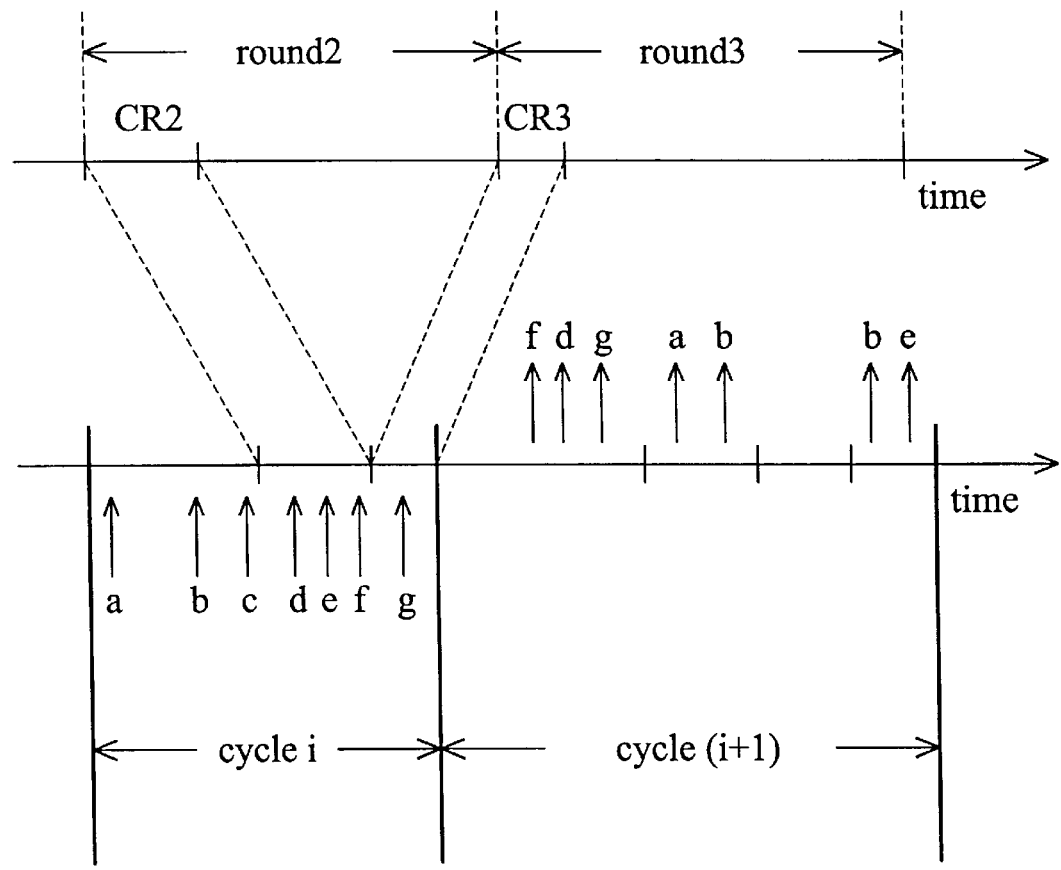
FIG. 5 is the diagram illustrating the relationship between contention cycle and a contention round.
Figure 6:
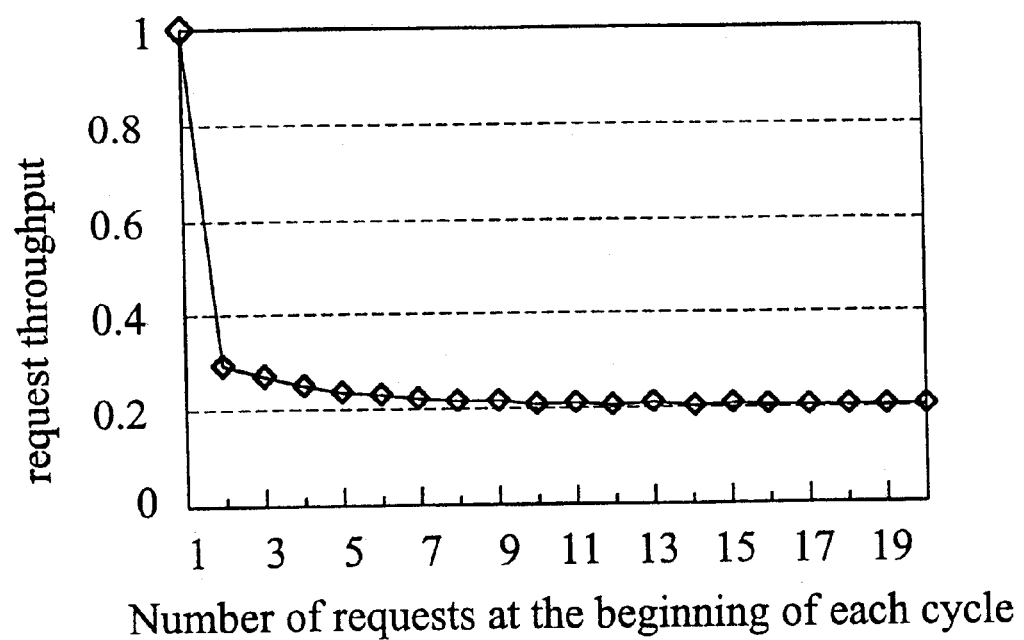
FIG. 6 is a graph illustrating the relationship between request throughput and the number of requests at the beginning of each cycle.
Figure 7:
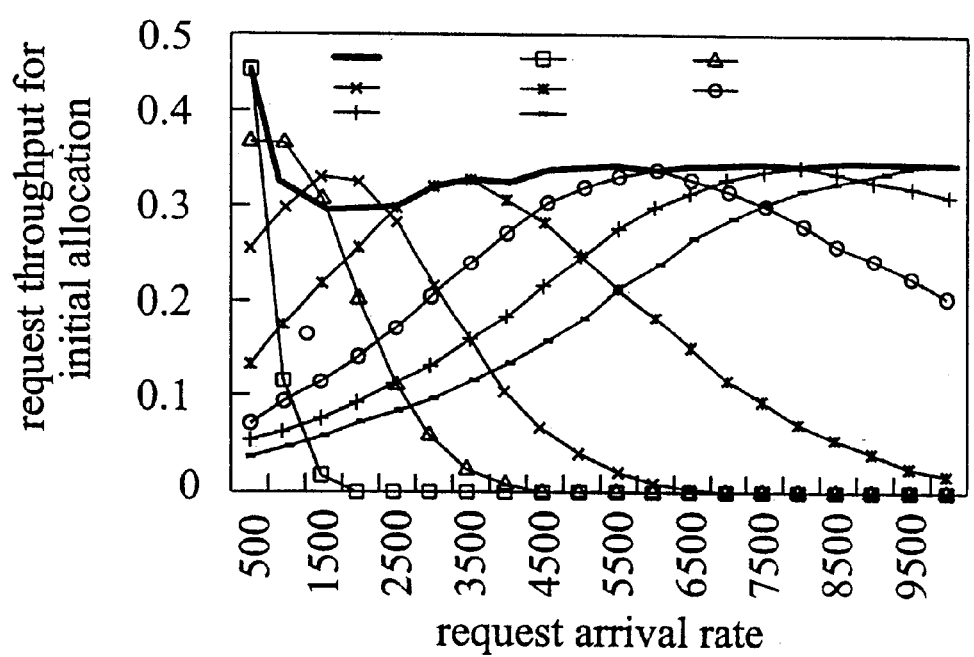
FIG. 7 is a graph illustrating the relationship between request throughput for initial allocation and the request arrival rate.
Figure 8:
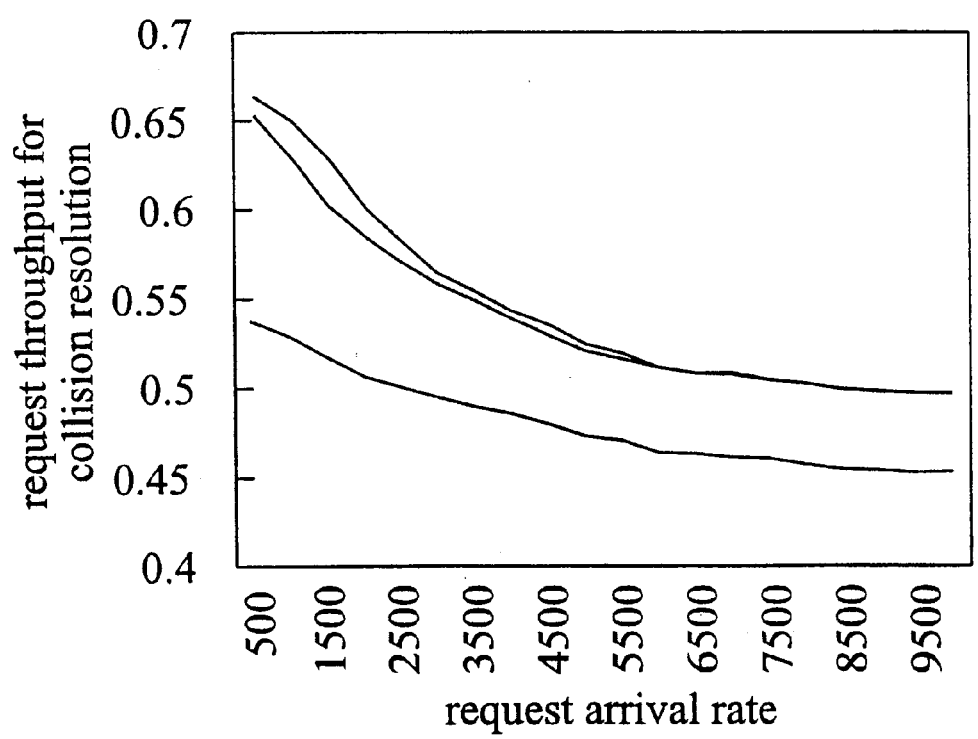
FIG. 8 is a graph illustrating the relationship between request throughput for collision resolution and the request arrival rate.

Referring to FIG. 5, in the contention process of present invention, each round defines various optimal contention regions based on the collided cluster. A request may be resent due to the collision to make all requests successfully need one or more contention rounds, and these rounds form a contention cycle.

Therefore, to obtain the optimal contention region, the number of contention requests $n_{i,1}$ for the next contention cycle must be estimated, wherein $n_{i,1}$ is the number of initial requests at the $1^{st}$ contention round of $i^{th}$ contention cycle. In order to obtain $n_{i,1}$, the contention process of the present invention utilizes a blocking mode. The rule of the blocking mode is all successful requests in a cycle must start a new contention from the beginning of the next contention cycle. Thus, the $n_{i-1}$ contention requests at cycle $i-1^{th}$ are obtained from cycle $i-2^{th}$. Besides, in practical operational conditions, the arrival process uses the stationary process as the basis of evaluation. That is, the success rate of request in two adjacent cycles is close to the steady state. Thus, the number of requests at each cycle is in the time proportional scheme. According to the assumption, the number of contention requests $n_{i,j}$ at cycle i can be estimated from the following equation:

$$\frac{n_{i,1}}{n_{i-1,1}} = \frac{\text{length}(\text{cycle}\, i-1)}{\text{length}(\text{cycle}\, i-2)}$$

Then, the number of requests at each contention round are estimated. The estimating method is performed by looking up MLR(d,s,c) table, wherein d is the contention region of allocation, s is the number of successful requests, and c is the number of collided clusters being observed. $n_{i,j}$ is the number of requests to be contended at the $j^{th}$ contention round of the $i^{th}$ contention cycle, and j>1. The equation to estimate the value of $n_{i,j}$ is as following:

$$n_{i,j} = MLR(d, s_{i,j-1}, c_{i,j-1}) - s_{i,j-1}$$

wherein $MLR(d, s_{i,j-1}, c_{i,j-1})$ is the number of most likely requests at the $(j-1)^{th}$ round of the $i^{th}$ cycle, $s_{i,j-1}$ is the number of successful requests at the $(j-1)^{th}$ round of $i^{th}$ cycle. Therefore, $n_{i,j}$ of the equation is the number of collided requests at the $j^{th}$ round.

Finally, the OPT(n,d) table is looked up to obtain a value d related to $n_{i,j}$, wherein the value d is the optimal contention region at the $j^{th}$ contention round of the $i^{th}$ contention cycle. The optimal contention region $d_{i,j}$ is allocated at the beginning of the $j^{th}$ round of the $i^{th}$ cycle, thus increasing the possibility of success. Further, the optimal contention region allocation optimizes the requests throughout.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements, which is defined by the following claims and their equivalents.

What is claimed is:

1. A method for an optimal contention region allocation for medium access control in multipoint-to-point networks, which is utilized in a plurality of contention slots, each contention round defining at least one optimal contention region, and a plurality of contention rounds forming a contention cycle, the method comprising the steps of:

establishing a Most Likely Request Table MLR(d, s, c) in order to estimate the number of the most likely requests, where d is the given contention region, s is the number of successful requests, and c is the number of collided clusters;

establishing an Optimal Table OPT (n, d) in order to find the optimal contention region, where n is the estimated number of contention requests and d is the corresponding optimal contention region corresponding to the value n;

estimating the number of contention requests $n_{i,l}$, where i is the contention cycle and $n_{i,l}$ is the initial number of requests at the start of the contention cycle i;

estimating the number of contention requests $n_{i,j}$, where j>1, and $n_{i,j}$ is the number of requests in the $j^{th}$ contention round of the contention cycle i, wherein according to the contention result of the previous contention round, the estimating method uses the MLR (d,s,c) table to estimate the number of requests $n_{i,j}$;

utilizing the number of requests $n_{i,j}$ as an index, searching for a value d corresponding to the number of requests $n_{i,j}$ from the OPT (n, d) table, where the value d is the optimal contention region in the $j^{th}$ contention round of the contention cycle $i^{th}$; and allocating said value d to the $j^{th}$ contention round of the contention cycle i to be the optimal contention region required.

2. The method as claimed in claim 1, wherein the MLR (d,s,c) table can be obtained by the simulation of the contention situation performed in a computer, the method for obtaining the MLR(d,s,c) comprising the steps of:

determining a contention region d and a number of requests participating in the contention;

utilizing the computer to simulate each request number for t times according to the practical contention situation simulation, where t is at least $10^3$, s is the number of successful requests, and c is the number of collided clusters; and defining the combinational number (s,c) of requests with the maximum presence as the most likely request value of MLR (d, s, c).

3. The method as claimed in claim 1, wherein the contention cycle is a blocking mode.

4. The method as claimed in claim 2, wherein according to a blocking mode, under a time proportional scheme, the number of contention requests $n_{i,j}$ in the contention cycle i can be estimated from the equation as follows:

$$\frac{n_{i,l}}{n_{i-1,l}} = \frac{\text{length}(\text{cycle}\, i-1)}{\text{length}(\text{cycle}\, i-2)}$$

where $n_{i-1,l}$ is the initial number of requests at the beginning of contention cycle i−1, cycle i−1 is the cycle previous to cycle i, and cycle i−2 is the cycle previous to cycle i−1.

5. The method as claimed in claim 1, wherein $d_{i,j}=n_{i,j}$ while OPT (n, d) table is utilized for a synchronized contention region system.

6. The method as claimed in claim 1, wherein OPT(n,d) can be derived from p(n,m,d) while the OPT (n, d) table is utilized for asynchronizing a contention region system, where p(n,m,d) is the probability of m successful requests while n requests contend for d slots, the method of utilizing p(n,m,d) to establish the OPT (n,d) table comprising the steps of:

defining opt_d_n as an optimal contention region corresponding to the number of contention requests n, where n>1;

determining whether the number of requests n is ranged between larger than 1 and less than the maximum number k;

testing the contention region opt_d_n from 1 to a given maximum number max_d for each request number n, and counting spent time; and selecting one contention region opt_d_n from 1 to the number max_d based on which testing time is the shortest to be the d value of the current testing request.

* * * * *